United States Patent [19]
Kramer

[11] Patent Number: 6,066,282
[45] Date of Patent: May 23, 2000

[54] PROCESS FOR MAKING A TOOTHBRUSH

[75] Inventor: Hans Kramer, Buhl, Germany

[73] Assignee: SmithKline Beecham Consumer Healthcare GmbH, Baden, Germany

[21] Appl. No.: 08/981,776

[22] PCT Filed: Jul. 4, 1996

[86] PCT No.: PCT/EP96/02978

§ 371 Date: May 27, 1998

§ 102(e) Date: May 27, 1998

[87] PCT Pub. No.: WO97/02770

PCT Pub. Date: Jan. 30, 1997

[30] Foreign Application Priority Data

Jul. 7, 1995 [GB] United Kingdom ............... 9513883

[51] Int. Cl.[7] ............................ A46D 3/00; B29C 45/00
[52] U.S. Cl. .................. 264/251; 264/243; 264/254; 264/263; 264/279; 15/167.1; 300/21
[58] Field of Search ............... 15/143.1, 144.1, 15/167.1, 172, 187, 188; 264/243, 251, 254, 259, 263, 271, 279; 300/21

[56] References Cited

U.S. PATENT DOCUMENTS

| | | | |
|---|---|---|---|
| 759,490 | 5/1904 | Yates | 15/143.1 |
| 2,298,156 | 10/1942 | Person | 300/21 X |
| 2,592,296 | 4/1952 | Kutik | 300/21 X |
| 2,783,490 | 3/1957 | Kutik | 300/21 X |
| 2,923,035 | 2/1960 | Schwartz | 300/21 X |
| 3,633,237 | 1/1972 | Bagube | 15/188 |
| 5,224,764 | 7/1993 | Klinkhammer | 300/21 |
| 5,350,219 | 9/1994 | Shou-Jen | 300/21 |
| 5,636,904 | 6/1997 | Bell et al. | 300/21 |

FOREIGN PATENT DOCUMENTS

| | | |
|---|---|---|
| 504571 | 9/1992 | European Pat. Off. . |
| 5533609 | 8/1993 | European Pat. Off. . |
| 3923495 | 1/1991 | Germany . |
| 94/05183 | 3/1994 | WIPO . |

*Primary Examiner*—Mark Spisich
*Attorney, Agent, or Firm*—Nora Stein-Fernandez; Janice E. Williams; Charles M. Kinzig

[57] ABSTRACT

This invention relates to a process for making a toothbrush comprising making a toothbrush head having at its basal end a first engagement part, then making a toothbrush grip handle from a plastics material by a handle molding process, during the handle molding process forming a second engagement part at the head end of the handle in engagement with the first engagement part, such that the engagement between the first and second engagement parts retains the head and grip handle together, and toothbrushes made by this process.

23 Claims, 2 Drawing Sheets

PROCESS FOR MAKING A TOOTHBRUSH

This invention relates to toothbrushes and to processes for making toothbrushes, particularly toothbrushes made of plastics materials and injection moulding processes for making toothbrushes.

Toothbrushes generally consist of a bristle-bearing head integrally linked at the basal end of the head to the head end of a grip handle. Often the head end of the grip handle forms a thinned neck.

Generally, known toothbrushes are made of plastics materials by an injection moulding process in which the head and handle are integrally formed, then bristles are inserted into sockets in the head and retained therein by small metal clips. Alternatively bristles can be directly fixed into the head during the moulding process, so that for example the fixed ends of the bristles have soft plastics material injected into a mould around them, and when this material sets the bristles are thereby firmly fixed into the head. For example WO 95/30350 and EP 0504571A disclose such an injection moulding process.

Injection moulding processes have been developed in which the head and handle are integrally moulded out of rigid plastics materials, then a second, elastomeric material is introduced in a subsequent injection moulding process to form a two-component toothbrush, for example including a grip mat on the grip handle made of the elastomeric material, or a cut-out between the head and handle filled with the elastomeric material to modify the relative flexibility between the head and the handle. Such toothbrushes are described in GB 2216785 A and DE 3923495, and such a process is for example disclosed in WO 94/05183.

A problem with such known toothbrushes is that it is difficult to vary the combination of head and handle (e.g. to vary the shape of the head whilst retaining the shape of the handle constant or vice versa) without the expense of making an entirely new mould for an integral head and grip handle. A further problem occurs in that the speed at which bristle-bearing toothbrush heads can be made may vary from the speed at which handles, particularly two-component handles, can be made. Therefore the speed of the manufacturing process is limited by the speed of the slower machine.

It is an object of the present invention, in part at least, to alleviate these problems. Other objects and advantages of the present invention will be apparent from the following description.

According to this invention, a process for making a toothbrush comprises the steps of: making a toothbrush head from a plastics material by a head moulding process, the head having at its basal end a first engagement part; then making a toothbrush grip handle from a plastics material by a handle moulding process, during the said handle moulding process forming a second engagement part at the head end of the handle in engagement with the first engagement part, such that the engagement between the first and second engagement parts retains the head and grip handle together.

In an alternative form of this invention, a process for making a toothbrush comprises the steps of: making a toothbrush grip handle from a plastics material by a handle moulding process, the grip handle having at its head end a first engagement part; then making a toothbrush head from a plastics material by a head moulding process, during the said head moulding process forming a second engagement part at the basal end of the head in engagement with the first engagement part, such that the engagement between the first and second engagement parts retains the head and grip handle together.

In another alternative form of the process, a toothbrush head and a toothbrush grip handle are made separately by respective head and handle moulding process, the head and handle having respective engagement parts respectively at the basal end of the head and the head end of the neck, and the respective engagement parts are linked together by forming a mass of plastics material, by a moulding process, in engagement with the said engagement parts such that the engagement between the said engagement parts and the mass retains the head and grip handle together.

In an optional additional step a further material, suitably an elastomeric material, is formed around at least part of the first and/or second engagement parts, or the engagement parts and the mass, suitably to such an extent that the combined first and/or second engagement parts, or the engagement parts and the mass, are at least partly enclosed by the further material.

In one embodiment of this invention, the toothbrush head with its first engagement part is formed first. The first engagement part in this embodiment may comprise an integral projection, in the form of a pin or stud, projecting from the basal end of the head. The projection may have an enlargement at its end remote from the head, and this enlargement may for example be rounded, e.g spherical, or for example may taper toward a point away from the head. In one version of this embodiment the second engagement part, on the handle, may be formed engaged around the said projection in the manner of a socket surrounding the end of the projection such that the head and handle are retained together by a male-female type of engagement. Alternatively the first engagement part may comprise another kind of feature in engagement with which a handle may be formed, e.g a concavity in the basal end of the head, into which plastic material introduced during the moulding process in which the handle is made may flow and engage with the concavity.

The head and grip handle so made may be mobile relative to each other whilst retained together, in that the engagement of the first and second engagement parts or of the mass and the engagement parts may allow the head and handle to move relative to each other. For example the projection at the basal end of the head, e.g the enlargement, may be free to rotate or oscillate within the second engagement part. This may be achieved by the formation of the second engagement part by a moulding process that creates no weld between the first and second engagement parts. For example the enlargement may be able to move in a ball and socket type of engagement within a second engagement part which includes a cavity for the enlargement. For example the head may be formed first of a high melting point plastics material, and the grip handle may be formed subsequently of a low melting point plastics material. In this construction of the toothbrush a further material such as an elastomeric material may be formed around the link between the first and second engagement parts to modify their relative flexibility, e.g. to allow resilient flexibility but without complete freedom of rotation.

Alternatively in another version the first and second engagement parts, or the mass and the engagement parts, may be fixed together in a manner that does not allow the first and second engagement parts, or the mass and the engagement parts, to move relative to each other. This may be achieved by the formation of the second engagement part by a moulding process that creates a weld between the first and second engagement parts, i.e. that causes at least part of their adjacent surfaces to fuse together to form an integral link between the head and the grip handle.

In one embodiment of the process of the invention the first engagement part may fuse during the formation of the second engagement part, or the engagement parts may fuse during formation of the mass, to the extent that the first and second engagement parts, or the engagement parts and the mass, are fused into an integral link between the head and the handle. As a consequence there may be no easily distinguishable break in the continuum of plastic material between the first and second engagement parts, or the engagement parts and the mass. The engagement between the first and second engagement parts is thereby, in this version, by virtue of their being fused together into such an integral mass.

For example the head may be so made with a projection at its basal end, and the handle may be formed by a moulding process in which the end of the neck closest to the head is formed by moulding around this projection, and fused into an integral mass with this projection. In this way the first and second engagement parts may become indistinguishable. For example the head and handle may be formed of plastics materials that have substantially the same melting point, e.g. of the same material, so that the injection of the hot plastics material of the second engagement part around the first engagement part causes them to fuse together.

Such a fused joint may be flexible, e.g. resiliently flexible, particularly if the joint is at a thinned neck region. In this construction a further material such as an elastomeric material may be formed around the link between the first and second engagement parts to conceal the joint and to visually emphasise the novel construction, and/or additionally to modify the flexibility of the head-neck or head-handle joint.

The moulding process used herein to make the respective head and grip handle of the toothbrush may be essentially conventional injection moulding processes in themselves. For example the respective head or grip handle with the first engagement part may be made by injection moulding of plastics material in a first cavity mould, e.g conventionally made of openable mould parts. At least the first engagement part, if not the whole head, of the so-produced head or handle may then be enclosed within a second cavity mould, in the cavity of which the respective handle or head may be formed by injection moulding of plastics material. The shape of the cavity and the moulding conditions in this second cavity mould are such that the above-described engagement, e.g fusion, of the first and second engagement parts occurs.

The so-formed combination of head and grip handle may then be wholly or partly contained in a third cavity mould, and the further material, e.g a second component elastomeric material, may be introduced. Suitable moulding processes in which a second component, such an elastomer, can be introduced in this way and caused to bond to the plastics material have been well known in the toothbrush art for some years. The second component may be introduced via a single injection port, with flow channels in the toothbrush surface or structure to allow the component to flow from one site to the other on the toothbrush, or via multiple injection ports. A typical process is exemplified in WO 94/05183.

Bristles may be provided in the head by an essentially conventional process. For example the ends of bristles may be fused into the head material during the moulding process by which the head is formed. Such a process is described for example in WO 95/30350. Alternatively the bristles may be inserted and retained by clips in sockets in the head after the head or the head-grip handle combination has been made, in a conventional manner. When the head is made first and separately from the handle, bristles may be provided in the head by such processes before the handle is made.

Suitable plastics and elastomeric and bristle materials for the toothbrush of the invention are known, and may for example be the materials presently used for toothbrushes.

The invention also provides a toothbrush of plastics material in which the toothbrush head is linked to the grip handle by the engagement of a first engagement part on the respective handle or head, in which the said first engagement part is first formed, and the second engagement part is then subsequently formed in engagement with the first engagement part. Suitably the first and second engagement parts are formed welded or otherwise fused together as described above. Suitably in such a toothbrush a further material, suitably an elastomeric material, is formed around at least part of the first and/or second engagement parts, suitably to such an extent that the first and/or second engagement parts are entirely enclosed by the further material.

The invention also provides a toothbrush of plastics material in which the toothbrush head is linked to the grip handle by the engagement of an engagement part on the basal end of the head and an engagement part on the head end of the handle, with a mass of plastics material formed by a moulding process in engagement with the said engagement parts.

The present invention also provides a toothbrush head having at its basal end a first engagement part, suitable for the process and the toothbrush of this invention.

The toothbrush of this aspect of the invention may be made by the above-described processes, and the present invention therefore also provides a toothbrush which is the product of the above-described processes.

The toothbrush of the invention may include features conventional to toothbrushes, e.g. an elastomeric grip pad which may be formed during the same moulding process in which a further elastomeric material is introduced, and/or a folded region to modify flexibility as disclosed in GB 2216785 A.

The process and toothbrush of the invention alleviate the above-mentioned problems of manufacture because the head may be redesigned separately from the handle, and therefore there is no need to make a whole new toothbrush mould when only the head is redesigned (or vice versa). Also if the head-making machine is slower than the handle-making machine, for example if bristles are inserted of fused into the head, a multiple of head making machines can be used with each handle-making machine, to compensate for the difference in rate of operation.

The invention will now be described by way of example with reference to the following figures:

FIGS. 1 and 2 respectively show in longitudinal section and in plan a toothbrush head of this invention.

Figure 2:
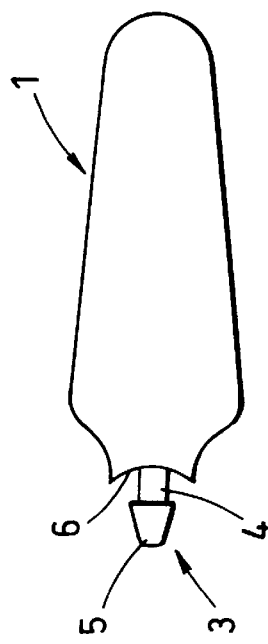
Figure 1:
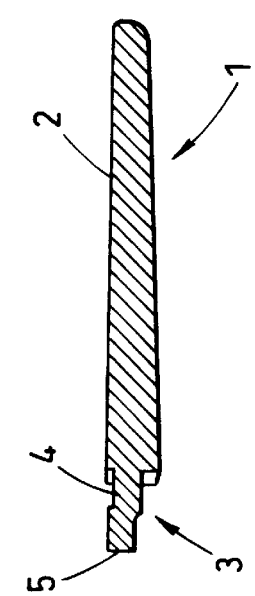

Referring to FIGS. 1 and 2, a toothbrush head 1 of generally conventional shape has been made by injection moulding of conventional plastics material using conventional moulding technology. Bristles are mounted in a bristle face 2 of the head but for clarity are not shown. These bristles may be forced into socket holes in the face 2 by means of conventional clip fittings, or alternatively the bristles may be fixed into the face 2 by moulding the plastics material of the head 1 around the ends of the bristles so as to embed them in the head 1.

At the basal end 3 is formed a first engagement part in the form of a pin 4 with an enlarged end 5 remote from the basal end 3 of the head. Where the pin 4 projects from the basal end 3 the basal end 3 is in the shape of a concave cavity 6. The enlargement is in the form of a shape tapering to a point remote from the head 1, e.g a wedge shape or cone shape as shown. The pin 4 has been formed by an injection moulding process in which the mould cavity forms the outline of the head 1, pin 4 and enlarged end 5.

Figure 3:
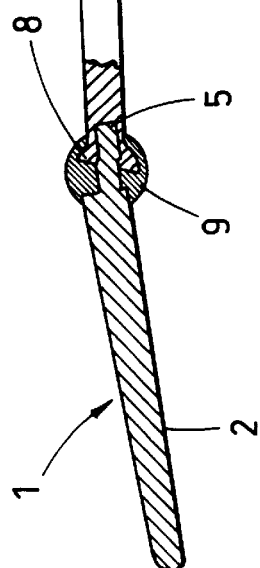
FIG. 3 shows a toothbrush manufactured by the process of this invention, with the head and immediately adjacent part of the grip handle shown in section.
Figure 4:
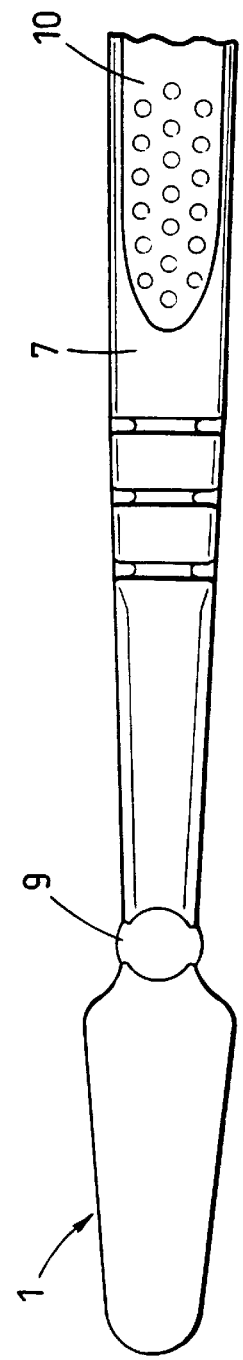
FIG. 4 shows a toothbrush manufactured by the process of this invention in a plan view.

Referring to FIGS. 3 and 4, the head 1 of FIGS. 1 and 2 has been inserted into an injection mould tool (not shown), with the pin 4 projecting into the mould cavity of the tool. A grip handle 7 of plastics material has been formed in the mould cavity by a second injection moulding process, the grip handle having a folded region as disclosed in GB 2216785 A.

In this second injection moulding process a second engagement part 8 has been formed around the pin 4, in the form of a moulded part of plastics material, surrounding the enlarged end 5 and the adjacent region of the pin 4. The part 8 is generally of a hemispherical shape, but may be of other shapes.

The pin 4, enlargement 5 and part 8 are fused together to form an integral link between the head 1 and handle 7. This may be achieved in various ways. In particular if the plastics material of the grip handle 7 is injected under pressure into the moulding tool cavity at a temperature close to or above the melting point of the plastics material of the head 1, and particularly if the plastics material of the head 1 and grip handle 7 are the same, the part 8 and at least the surface of pin 4 and enlarged end 5 can fuse, to weld the head 1 and handle 7 together such that the pin 4, enlarged end 5 and part 8 form an integral link between the head 1 and handle 7. This fusion can occur as the hot molten plastic forming the part 8 flows around the pin 4 and enlargement 5 during the moulding process. The entire pin 4 and enlargement 5 can fuse to form an integral mass with the part 8 as this is formed.

Alternatively if the plastics material of the handle 7 is injected at a lower temperature than the melting point of the plastics material of the head 1, and particularly if the enlarged end 5 is spherical in shape, the head 1 may be free to rotate about the ball and socket joint between the head 1 and handle 7 so formed.

In a further injection moulding step, the assembly of head 1 and handle 7 may be transferred to the cavity of a further moulding tool, and an elastomeric material is injected in around the joint of the first and second engagement parts 4, 8. In FIGS. 3 and 4 this elastomeric material is shown in the form of a generally spherical shaped mass 9 around the joint. Using injection moulding techniques which are known in the art the elastomeric mass 9 may be caused to fuse with the plastics material of the head 1, pin 4, enlarged end 5 and part 8. Additionally the immediately adjacent surfaces of the pin 4, second engagement part 8 and the head 1 near its basal end may be provided with surface grooves, roughening, dimples, projections etch (not shown) to assist the adhesion of the elastomeric material 9 to the plastics material.

The grip handle 7 is also provided with a grip pad 10 made of elastomeric material fused to the plastics material of the grip handle 6. This may be of the same material as mass 9, and may be injected into the mould cavity of the same type of mass 9 through a second injection port (not shown).

In the embodiment shown in FIGS. 3 and 4 the joint between the head 1 and handle 7 is integral and via the thinned pin 4, and this can result in flexibility of this joint. The surrounding mass 9 of elastomeric material can help to control the flexibility of this joint. Additionally if there is no weld between pin 4 and part 8 such that the pin 4 can oscillate or rotate within part 8, the mass 9 can limit the extent of such rotation or oscillation.

It will be appreciated that heads 1 may be made and stored for later use or immediately combined with a grip handle 7. This allows the advantages of producing different combinations of heads 1 and grip handles 7. Also the advantage is provided of matching the capacity of a head making process to the handle making process. For example if handles 7 can be made twice as fast as heads 1, then two head making machines can feed one handle making machine.

The above described process may be carried out using injection moulding machinery and bristle filling machinery which is generally conventional in the field of toothbrush manufacture.

Figure 5A:
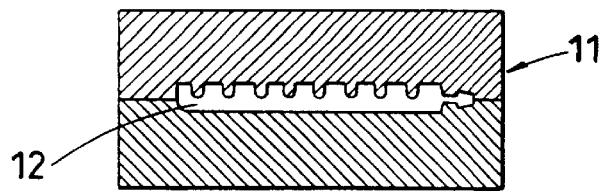
FIGS. 5A–5D show schematically the moulding process by which the toothbrush of FIGS. 1–4 is made.

Referring to FIGS. 5A–5D, a first cavity mould 11 is shown schematically in FIG. 5A, comprised of two openable mould parts defining an internal cavity 12. By injection of plastics material into this cavity 12 (via an injection point not shown) a toothbrush head 1 as shown in FIGS. 1–4 can be made, with a pin 4 and enlargement 5, and socket holes for bristles (not shown).

Figure 5B:
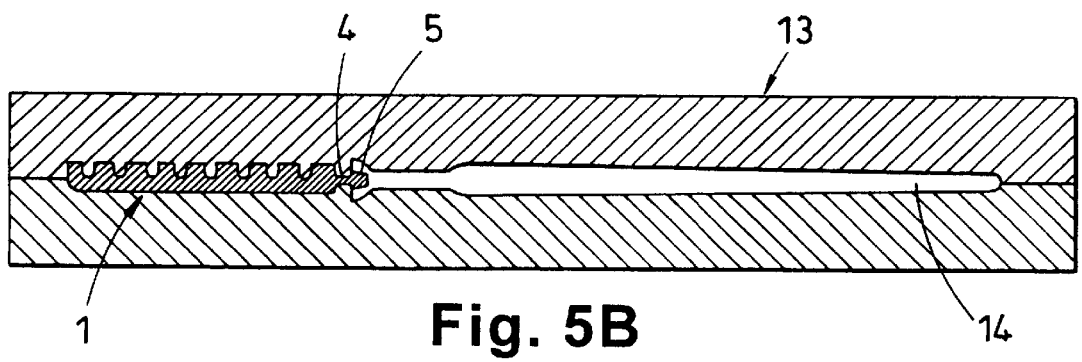

The so formed head 1 is then enclosed in a second cavity mould 13 as shown schematically in FIG. 5B, with at least the first engagement 4, 5 part of the head 1 extending into the internal cavity 14 of the mould 13. By injection moulding of plastics material (via an injection point not shown) into the cavity 14 a toothbrush handle 7 as shown in FIGS. 1–4 can be made. The moulding conditions in this second cavity mould 13 are such that the projection 4, 5 fuses with the surrounding plastic injected to form the handle 7 so that the handle 7 and head 1 are thereby integrally connected, the injected plastic material around the pin and enlargement 4, 5 forming a second engagement part 8.

Figure 5C:
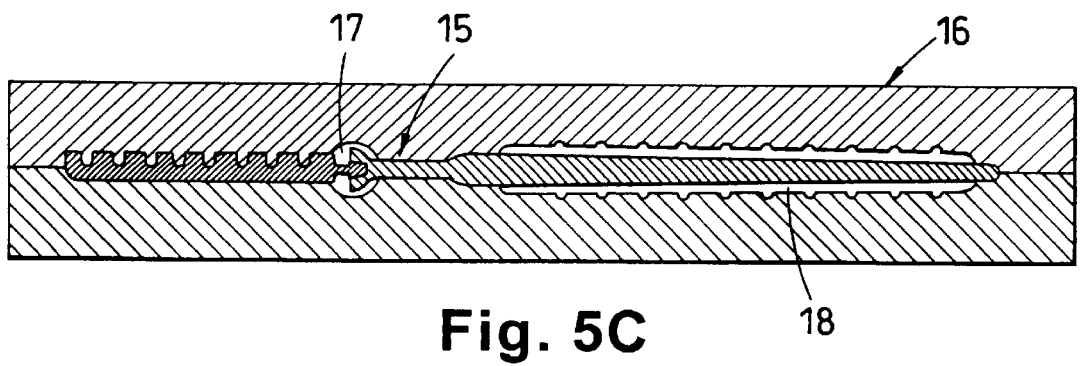

The so-formed integral combination 15 of head 1 and grip handle 7 is then enclosed in a third cavity mould 16 as shown schematically in FIG. 5C. This mould 16 has internal cavities 17, 18 in communication with the surface of the combination 15 about the link 4, 5, 8 between the head and handle, and at places where it is desired to form a grip pad 10. By injection (via an injection point not shown) of the further material, e.g a second component elastomeric material, may be introduced so as to form a mass 9 and grip pad 10.

Figure 5D:
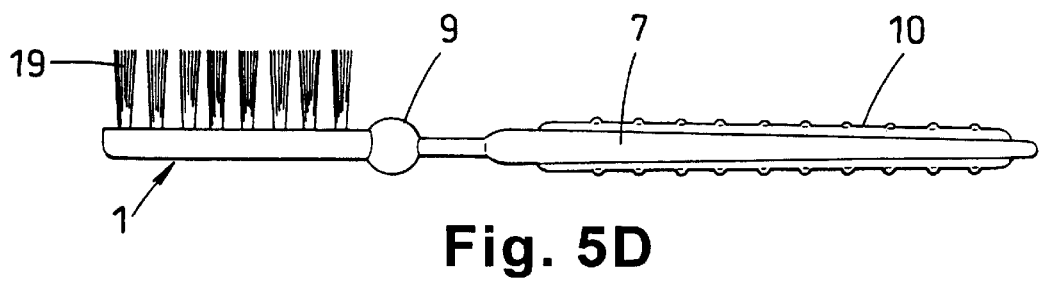

Bristles 19 may be inserted into the finished head of the toothbrush as shown in Fig 5D using a conventional process, e.g using small metal clips. Alternatively bristles 19 may be fused into the plastics material of the head 1 as the head 1 is made in the mould 11. This may for example be done by the processes described in EP 0142885A or WO 95/30350. It will be understood by those skilled in the art that the toothbrush head moulds described in these latter two references can easily be adapted to manufacture toothbrush heads with engagement parts, as well as whole toothbrushes. The toothbrush is shown schematically for simplicity in FIGS. 5A–5D, and could have a bent shape and folded region as shown in FIGS. 1–4.

I claim:

1. A process for making a toothbrush which comprises a head and a handle disposed along a longitudinal head-handle axis, the process comprising the steps of:

(a) making a toothbrush head from a plastics material by a head moulding process, the head having a basal end which in the assembled toothbrush is adjacent to the handle, the head having a first engagement part at its basal end;

(b) then making a toothbrush grip handle from a plastics material by a handle moulding process the handle having a head end which in the assembled toothbrush is adjacent to the head, during the said handle moulding process forming a second engagement part at the head end of the handle in engagement with the first engagement part, such that the engagement between the first and second engagement parts retains the head and grip handle together.

2. A process according to claim 1 wherein in an additional step a mass of further material is formed around at least part of the first and second engagement parts.

3. A process according to claim 1 wherein the first engagement part comprises an integral projection, in the form of a pin or stud, projecting from the basal end of the head.

4. A process according to claim 3 wherein the projection has an enlargement at its end remote from the head.

5. A process according to claim 4 wherein the second engagement part, on the handle, is formed engaged around the said projection in the manner of a socket surrounding the end of the projection such that the head and handle are retained together by a male-female type of engagement.

6. A process according to claim 3 wherein the second engagement part, on the handle, is formed engaged around the said projection in the manner of a socket surrounding the end of the projection such that the head and handle are retained together by a male-female type of engagement.

7. A process according to claim 1 wherein the first engagement part comprises a concavity in the basal end of the head, into which plastic material introduced during the moulding process in which the handle is made may flow and engage with the concavity.

8. A process according to claim 1 wherein the head and grip handle are made so as to be mobile relative to each other whilst retained together, in that the engagement of the first and second engagement parts allows the head and handle to move relative to each other.

9. A process according to claim 1 wherein a mass of an elastomeric material is formed around the first and second engagement parts.

10. A process according to claim 1 wherein the first and second engagement parts are fixed together in a manner that does not allow the first and second engagement parts to move relative to each other.

11. A process according to claim 10 wherein the first engagement part fuses during the formation of the second engagement part such that the first and second engagement parts fuse to form an integral link between the head and handle.

12. A process according to claim 11 wherein the head is made with a projection being a part of the first engagement part at its basal end, and the handle is formed by a moulding process in which the end of the handle closest to the head is formed into said second engagement part by moulding around this projection and this end is fused into an integral mass with this projection.

13. A process according to claim 12 wherein an elastomeric material is formed around the first and second engagement parts.

14. A process according to claim 1 wherein the head with the first engagement part is made by injection moulding of plastics material in a first cavity mould;

then at least the first engagement part of the so-produced head is enclosed within a second cavity mould, in the cavity of which the handle is formed by injection moulding of plastics material, the moulding conditions in this second cavity mould being such that fusion of the first and second engagement parts occurs;

then the so-formed combination of head and grip handle is enclosed in a third cavity mould and an elastomeric material is introduced to form a mass around the first and second engagement parts.

15. A process for making a toothbrush which comprises a head and a handle disposed along a longitudinal head-handle axis, the process comprising the steps of:

(a) making a toothbrush grip handle from a plastics material by a handle moulding process, the grip handle having a head end which in the assembled toothbrush is adjacent to the head, the grip handle having a first engagement part at its head end;

(b) then making a toothbrush head from a plastics material by a head moulding process, the head having a basal end which in the assembled toothbrush is adjacent to the handle, during the said head moulding process forming a second engagement part at the basal end of the head in engagement with the first engagement part, such that the engagement between the first and second engagement parts retains the head grip handle together;

(c) then in a subsequent step forming a mass of an elastomeric material around and at least partly enclosing the first and second engagement parts.

16. A process according to claim 15 wherein the head and grip handle are made so as to be mobile relative to each other whilst retained together, in that the engagement of the first and second engagement parts allows the head and handle to move relative to each other.

17. A process according to claim 15 wherein the first and second engagement parts are fixed together in a manner that does not allow the first and second engagement parts to move relative to each other.

18. A process according to claim 15 wherein the grip handle with the first engagement part is made by injection moulding of plastics material in a first cavity mould;

then at least the first engagement part of the so-produced handle is enclosed within a second cavity mould, in the cavity of which the head is formed by injection moulding of plastics material, the moulding conditions in this second cavity mould being, such that fusion of the first and second engagement parts occurs;

then the so-formed combination of head and grip handle is enclosed in a third cavity mould and an elastomeric material is introduced to form said mass around the first and second engagement parts.

19. A process for making a toothbrush which comprises a head and a handle disposed along a longitudinal head-handle axis, the process comprising the steps of:

(a) in a head moulding process making a toothbrush head which has a basal end which in the assembled toothbrush is adjacent to the handle, the head having a fist engagement part at its basal end;

(b) in a handle moulding process making a toothbrush grip handle which has a head end which in the assembled toothbrush is adjacent to the head, the grip handle having a second engagement part at its head end, positioning the first and second engagement parts adjacent to each other;

(c) then in a subsequent injection moulding process forming a mass of plastics material in engagement with the first and second engagement parts such that the engagement between the first and second engagement parts and the mass retain the head and grip handle together.

20. A process according to claim 19 wherein the engagement parts and the mass are fixed together in a manner that does not allow the first and second engagement parts to move relative to each other.

21. A process according to claim 20 wherein the engagement parts fuse during formation of the mass such that the first and second engagement parts and the mass are fused to form an integral link between the head and the handle.

22. A process according to claim 19 wherein the head and grip handle are made so as to be mobile relative to each other whilst retained together, in that the engagement of the mass and the engagement parts allows the head and handle to move relative to each other.

23. A process according to claim 19 wherein said mass of plastics material is an elastomeric material.

* * * * *